United States Patent
Van de Capelle et al.

(10) Patent No.: US 7,433,061 B2
(45) Date of Patent: Oct. 7, 2008

(54) METHOD AND SYSTEM FOR MULTI-PAGE EXCEPTION PROGRAMMING IN A DOCUMENT MANAGEMENT SYSTEM

(75) Inventors: Jean-Pierre R. M. Van de Capelle, Rochester, NY (US); John L. Lanphere, Honeoye Falls, NY (US); H. Michael Riebesehl, Webster, NY (US); Bradley E. Vernon, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 914 days.

(21) Appl. No.: 10/757,281

(22) Filed: Jan. 14, 2004

(65) Prior Publication Data

US 2005/0152000 A1    Jul. 14, 2005

(51) Int. Cl.
G06K 15/00    (2006.01)

(52) U.S. Cl. .................. 358/1.1; 358/1.12
(58) Field of Classification Search .............. 358/2.1, 358/1.1, 1.8, 434, 1.15, 1.12; 399/81
See application file for complete search history.

(56) References Cited

U.S. PATENT DOCUMENTS

| | | | |
|---|---|---|---|
| 4,532,554 A * | 7/1985 | Skala ..................... 358/434 |
| 4,982,234 A * | 1/1991 | Filion et al. ............. 399/81 |
| 5,045,880 A | 9/1991 | Evanitsky et al. |
| 5,052,679 A * | 10/1991 | Sekino .................... 271/293 |
| 5,079,723 A | 1/1992 | Herceg et al. |
| 5,175,679 A * | 12/1992 | Allen et al. ............. 700/28 |
| 5,319,464 A | 6/1994 | Douglas et al. |
| 5,705,020 A * | 1/1998 | Chiari ..................... 156/350 |
| 5,710,874 A | 1/1998 | Bergen |
| 5,790,119 A | 8/1998 | Sklut et al. |
| 5,815,643 A | 9/1998 | Van Deurzen et al. |
| 5,992,748 A * | 11/1999 | Takahashi et al. ....... 235/462.04 |
| 6,100,994 A * | 8/2000 | Schliekelmann et al. ... 358/1.15 |
| 2002/0124027 A1 | 9/2002 | Krueger et al. |
| 2003/0189726 A1 | 10/2003 | Kloosterman et al. |
| 2004/0046797 A1* | 3/2004 | Perry ...................... 345/771 |
| 2004/0122696 A1* | 6/2004 | Beringer .................. 705/1 |

FOREIGN PATENT DOCUMENTS

EP    0 482 311    4/1992
EP    482311    *    4/1992

* cited by examiner

Primary Examiner—Jerome Grant, II
(74) Attorney, Agent, or Firm—Maginot, Moore & Beck

(57) ABSTRACT

A system supports page exception programming in a document reproduction system without requiring cursor control to identify each page subject to exception processing. The exception page selector receives input that uses a naming convention to identify pages within a document for exception programming. The naming convention may include an odd/even designation, an imposition template identifier and/or page numerals. An exception programmer enables an operator to correlate different device color profiles for pages identified by the exception page selector. Exception parameters that may also be correlated to pages identified by the exception page selector include anti-aliasing, trapping, black overprinting parameters, and other known printing parameters.

18 Claims, 4 Drawing Sheets

METHOD AND SYSTEM FOR MULTI-PAGE EXCEPTION PROGRAMMING IN A DOCUMENT MANAGEMENT SYSTEM

FIELD OF THE INVENTION

The present invention relates generally to document management systems, and more particularly, to document management systems that support exception programming for the printing of documents.

BACKGROUND OF THE INVENTION

Document management systems include copiers, printers, and other reproduction systems. These systems typically include a document management station, a document input station, one or more document processors, and a document printer. The document input station controls the input of documents for reproduction purposes to the document management system. Documents may be input to a document management system through a document scanner, network, or electronic media. A document scanner typically includes a platen and document illumination system for imaging a hard copy of a document to generate an electronic version of the document. A network connection may be used to communicate an electronic version of a document to document management system for further processing before printing. Likewise, a disk drive or CD-ROM reader may be used to input one or more documents for processing and printing.

Once a document is input to a document management system, the document management station may be used to specify parameters for processing of a document for the printing and/or finishing of the print job. For example, the color rendering of a document, duplex or simplex reproduction, paper size, and the like may be specified for a print job. Job finishing may include stapling or other binding required for the final production of a reproduced version of a document.

Systems for facilitating the identification and setting of parameters for processing documents during the printing process are well known. One such system is that described in U.S. Pat. No. 5,175,679. This system enables an operator to specify parameters for a plurality of print jobs and then monitor and/or modify the print jobs as they are processed by the document management system. While this type of system is effective for the overall control of multiple jobs through a document management system, it is not very flexible for the alteration of job parameters for different pages within a processing job within a document. The specification of job processing parameters for specific pages within a document processing job is known as exception programming. One system that supports exception programming is disclosed in U.S. Pat. No. 4,982,234. The system of this patent uses a display that provides a visual indication of each individual page in a document. The user or operator may scroll through the representation of the document and specify one or more pages for exception processing and the exception parameters for processing the selected pages. Likewise, the system in U.S. Pat. No. 6,100,994 discloses a document processing system that uses a depiction of pages in a document so that a user may identify pages and exception parameters for processing of the selected pages.

While the systems of U.S. Pat. Nos. 6,100,994 and 4,982,234 support the selection of pages for exception processing and the identification of the parameters for such processing, the exception programming may be rather tedious for documents with numerous pages. For example, the copy quality on different pages may need to differ. In known document management systems, the copy quality may be programmed as exceptions for particular pages by individually selecting each of the pages to be associated with particular copy quality parameters and then specifying the copy quality for the selected group. For documents comprised of many pages, the requirement of highlighting each page with a cursor for the selection process is time consuming and prone to error. Selection errors may not be discovered until the reproduction job is completed and significant expense entailed in the reprogramming of the job.

Another type of printing exception is not currently supported by known document management systems. This exception arises from certain types of paper having a different coating on each side. Current systems require exception programming for each side of a page so that the proper printing parameters, such as color rendering, are performed for each side of a page. Furthermore, imposition schemes affect the order in which page sides are printed. In order to program the exception parameters for page sides in a job, the operator needs to identify when the page sides are printed for programming the color rendering parameters for a job.

There is a need, therefore, for a system and method for identifying pages for exception programming without requiring an operator or user to individually identify each page in a group to which a set of exception parameters apply.

There is also a need for a system and method for automatically correlating specific color rendering to page sides in a print job.

SUMMARY OF THE INVENTION

The present invention addresses the above needs, as well as others, by providing a method for exception programming of pages within a document that supports page identification without highlight or cursor control. An exemplary method of document management includes identifying pages within a document with a naming convention and specifying exception parameters for the identified pages. The naming convention used to identify pages for exception processing may be an even/odd designation or page numerals. The page numeral naming convention may identify specific pages in a document, a range that is defined by a starting and an ending page numeral, or a combination of specific page numerals and ranges. Also, the naming convention may include a combination of the even/odd designation within a range defined by a starting and an ending page numeral. That is, a range may be defined and then the even or odd pages within that range may be identified for exception processing.

Within the exemplary method of the present invention, color rendering exception processing may be supported. The method further includes identifying a first color rendering scheme for a document and identifying a second color rendering scheme for pages identified by a naming convention. The color rendering scheme may identify particular device color profiles. The method of the present invention may also specify exception parameters such as anti-aliasing, trapping, or black overprint parameters, for example, for pages identified by a naming convention.

A system for performing an implementation of an exemplary method of exception programming for a document management system includes an exception page selector for identifying pages within a document with a naming convention and an exception programmer for specifying exception parameters for the identified pages. The exception page selector preferably includes a displayed window coupled to one or more data objects for the input of the naming convention. The naming convention includes page identifiers such as one or more of the following: specific page numbers separated by white space characters, an imposition scheme template identifier, or an even/odd designation of pages within a document. A range may be included as part of a naming convention by using a starting page numeral and an ending page numeral separated by a range indicator such as a hyphen, for example. The naming convention may be processed by the data object or application program to generate a list of pages for which the document processing system applies a corresponding set of exception parameters.

The exception programmer may be comprised of one or more data objects or application programs for receiving exception parameters. Alternatively, the exception programmer may include data objects or application programs that provide particular exception parameters for a job when selected or activated. For example, a first button activated data object may be provided for color rendering of a particular color space on a reverse side of a particular type of paper while a second button activated data object may be provided for color rendering a second particular color space on an obverse side of the same type of paper. If an even/odd designator has been used for a page range to identify exception pages, then a first color rendering is used for odd pages within the page range in response to activation of the first data object. If the second data object is activated then a second color rendering is used for even pages within the page range.

Likewise, data objects, application programs or window input to a data object or application program may be used to specify other exception parameters such as anti-aliasing, black overprint, trapping or other known exception printing parameters. These exception parameters may be associated with identified pages for exception programming as the color rendering exceptions noted above. Thus, the system and method of the present invention permit an operator to identify pages for exception programming without requiring individual identification of every page in a group for exception programming and for supporting selection of pages within a range based on a even/odd designation. Furthermore, the system and method of the present invention enables an operator to correlate different color renderings to pages identified for exception programming, as well as other types of exception parameters.

The above described features and advantages, as well as others, will become more readily apparent to those of ordinary skill in the art by reference to the following detailed description and accompanying drawings.

DETAILED DESCRIPTION

Figure 1:
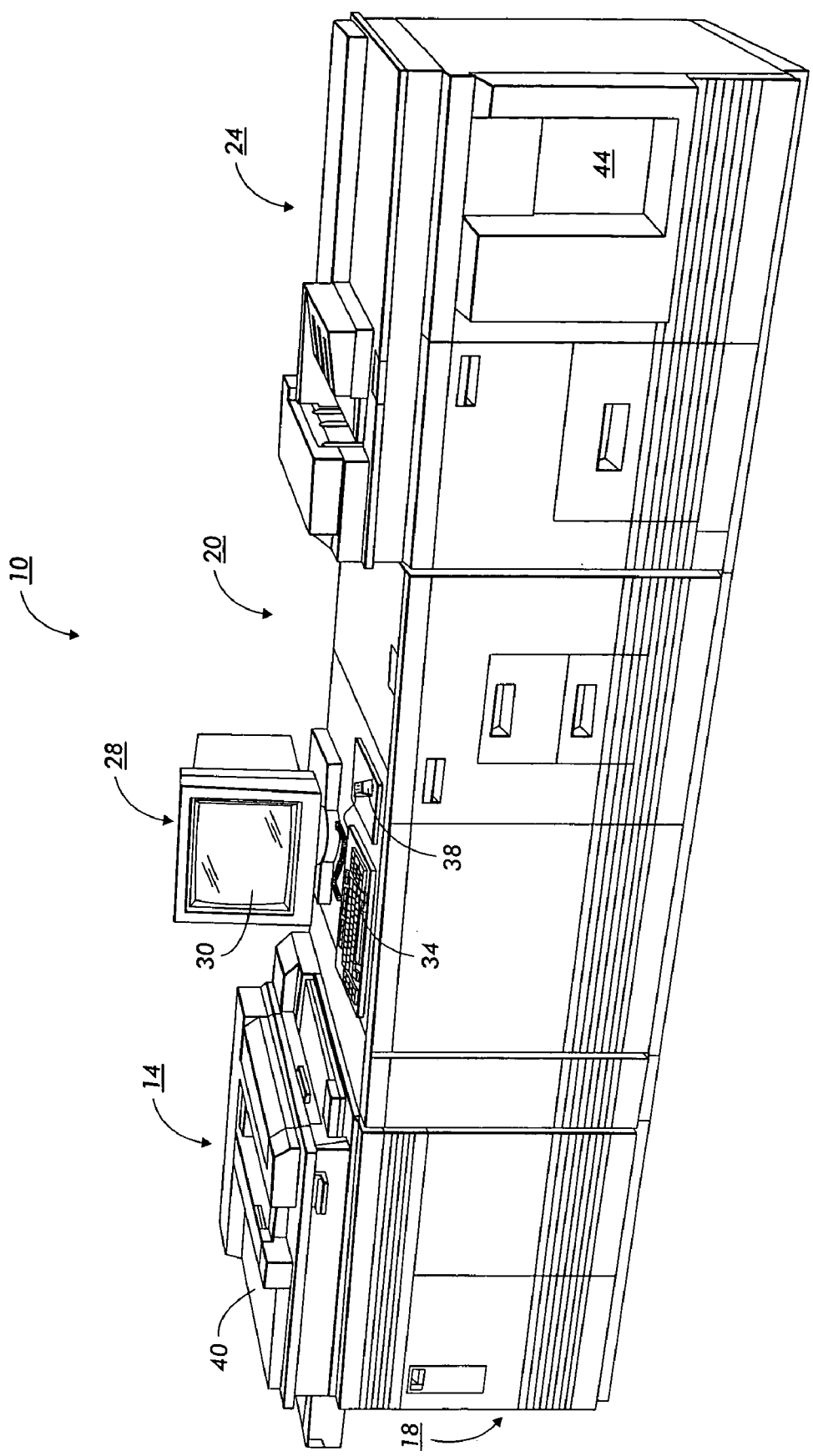
FIG. 1 shows a document management system in which a system and method implementing the principles of the present invention may be used.

FIG. 1 shows a system 10 in which the principles of the present invention may be implemented. System 10 includes an input module 14 having a controller 18, a document processing module 20, and a printer module 24. Document processing module 20 includes a document processing station 28 that includes a display 30, a keyboard 34, and a mouse 38. Controller 18 monitors and regulates the operation of scanner 40. Controller 18 also includes a network connection (not shown) for receiving electronic versions of documents from remote locations. Controller 18 may also include one or more electronic media readers for the input of documents from electronic storage media such as a CD-ROM and magnetically encoded disks. Document processing station 28 may be used by an operator to set parameters for scan operations, document processing, and document printing. The instructions for these various operations may be input via keyboard 34, mouse 38, or touch screen objects displayed on display 30. Document processing station 28 also includes a processor having memory and secondary storage, such as a disk drive, for storage of programs and data required for the processing documents through system 10. Printer module 24 includes one or more controllers for regulating the application of inks or toners to paper for the generation of documents as well as the control of papers moving through printer module 24 for proper registration in multi-channel color printing and the like. Printer module 24 includes one or more discharge areas 44 where finished documents are deposited by printer module 24 for retrieval.

A controller within printer module 24 manages device color profiles for color printing. These device color profiles are used to convert device independent color space coordinates to device dependent color space coordinates as is well known. In previously known systems, a device dependent color space profile is applied to a plurality of contiguous pages within a document or to an entire printing job. A controller within printer module 24 may also be used for trapping, anti-aliasing, and black overprinting or other known printing parameters. Trapping parameters for print jobs include trap widths, overprint specifications, choke information, spread information, bleed information, and trap zones. Anti-aliasing and black overprinting are also parameters for print jobs that are well-known within the industry.

Figure 2:
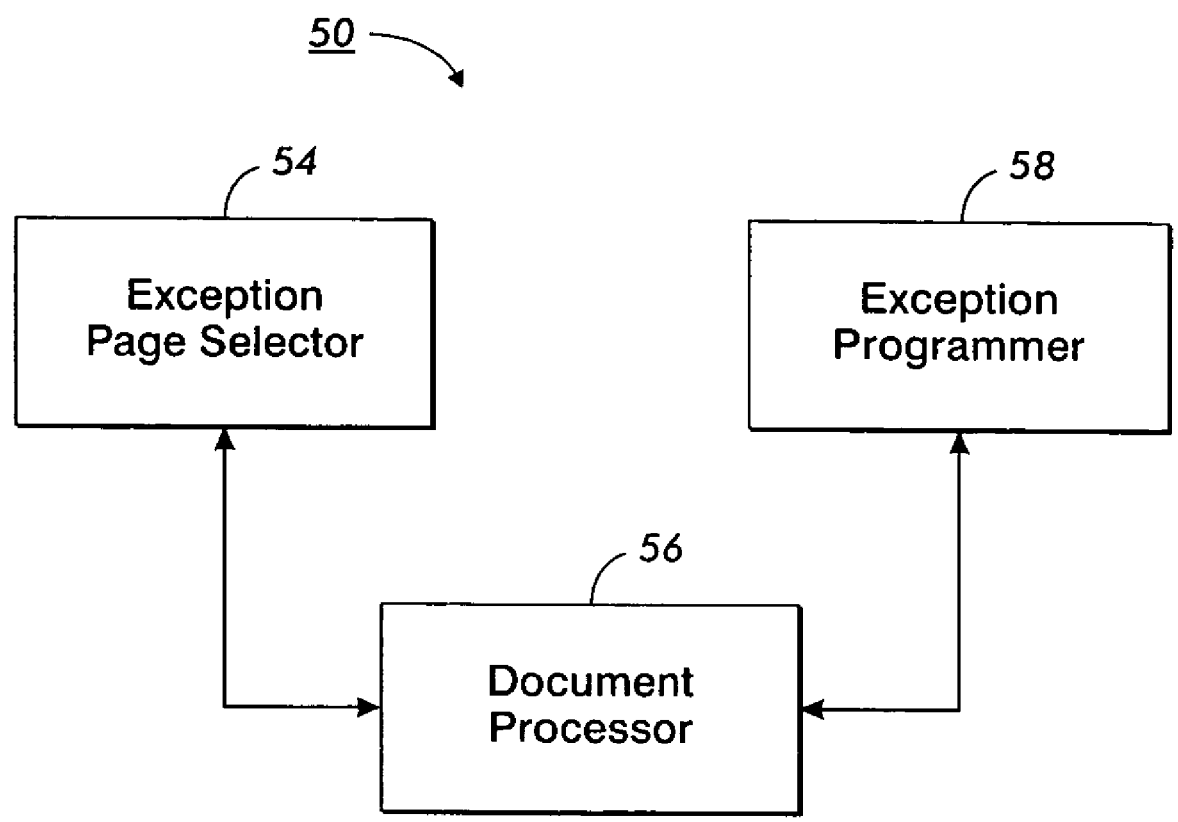
FIG. 2 shows a block diagram of a system for exception programming of pages within a document processed by the document management system of FIG. 1.

The processor and memory of document processing station 28 may be used to implement a system in accordance with the principles of the present invention as shown in FIG. 2. System 50 may include an exception page selector 54 for identifying pages within a document with a naming convention and an exception programmer 58 for specifying exception parameters for the identified pages. Exception page selector 54 and exception programmer 58 are preferably implemented with one or more data objects or other programs stored in memory, either primary or secondary, of a document processor 56 within document processing station 28. These objects may be displayed as part of a folder in a touch screen menu system as set forth in U.S. Pat. No. 5,079,723, commonly owned by the assignee of the present application. That patent is hereby expressly incorporated herein in its entirety. Data objects or application programs for selector 54 and programmer 58 may be written in any known programming language such as C++. Although the discussion herein is directed to an implementation using data objects for selector 54 and programmer 58, other implementations may be used. For example, selector 54 and programmer 58 may be implemented as terminate and stay resident (TSR) programs for a processor within station 28. They may also be implemented as plug-in applications for programs already existing within station 28 or simply as application programs that are invoked to support page exception programming. The programs for selector 54 and programmer 58 may also be written in other computer programming languages, such as C, Javascript, a document description language such as Postscript, or the like.

Figure 3:
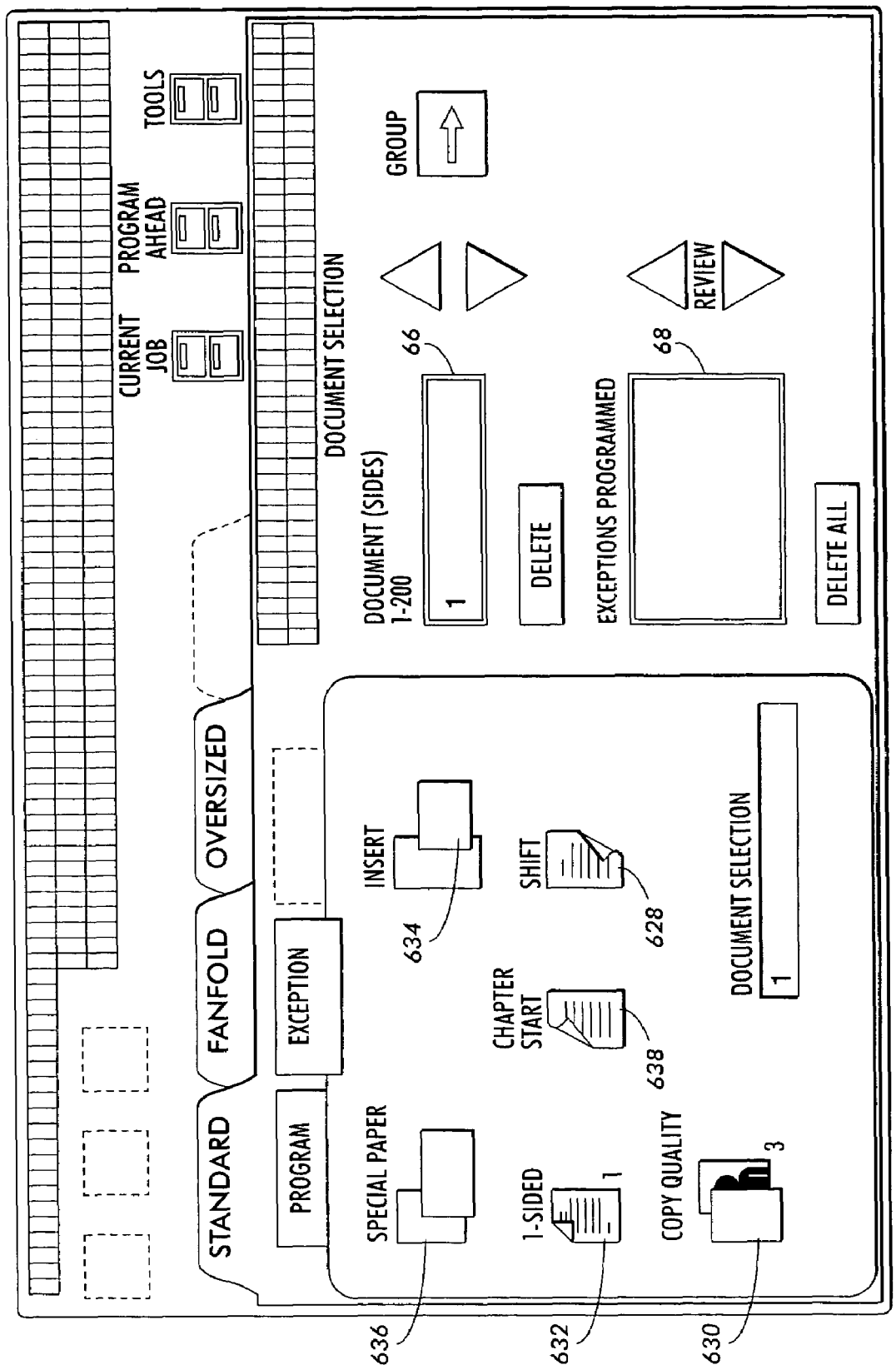
FIG. 3 depicts an exemplary display that supports the identification of pages for an exception programming group and the specification of the exception parameters for the group.

As shown in FIG. 3, a window 66 may be provided for input of a naming convention to a data object or other program. The naming convention may be entered by keystrokes on keyboard 34 or by using a menu in which naming convention options may be selected with mouse 38. A naming convention identifies a group of pages for exception programming without requiring the operator to individually identify each page in an exception programming group by moving a cursor to a page position and highlighting a page to include it in a group. Preferably, the naming convention includes one or more identifiers such as an imposition scheme template name, a page range, and a paper stock side identification. For example, the naming convention "23-47 'OneUpTemplate' odd" identifies the odd-numbered pages for the pages corresponding to page numbers 23 through 47 in a 1-up imposition scheme. A naming convention such as "23-47 'FourUpTemplate' coated-side" identifies the pages that are printed on the coated side of the paper using a 4-up imposition template within the range of pages numbered 23-47. This facilitates the identification of pages for exception over previously known methods that required the operator to select each odd-numbered page in this range by cursor placement and a highlighting function before specifying the exception parameters to be applied to the identified pages. The naming convention is used by one or more data objects or application programs to identify pages during the printing operation to which exception parameters are applied.

Also shown in FIG. 3, data window 68 may also be provided for specifying exception parameters for a group of identified exception pages. These exception parameters include, but are not limited to, device color profiles, trapping parameters, anti-aliasing settings, color correction parameters, image shift parameters, and black overprinting parameters. These parameters may be applied to pages identified for exception programming. Also, icons 636, 634, 632, 638, 628, and 630 may be activated by operation of mouse 38 to specify other exception parameters for correlation with an exception page group. Thus, the system of the present invention permits an operator to more easily identify a group of pages by a naming convention, such as even-numbered pages in a document or pages within an identified imposition scheme template, and apply the specified exception parameters, such as a particular device color profile, to the identified pages. In this example, the operator may also identify the odd-numbered pages or another range of pages within the imposition scheme as another exception group and apply a second device color profile or other page exception parameter to this group. In this manner, regardless of which duplex printing operation is performed by printer module 24, the pages identified by a naming convention are printed using one device color profile and the pages identified by a second naming convention are printed using a second device color profile. When the first and second device color profiles are selected to compensate for different coatings on each side of the paper used for a print job, the appearance of the color printing may be consistently maintained despite the different coatings used on opposite sides of the paper on which document pages are being printed.

Figure 4:
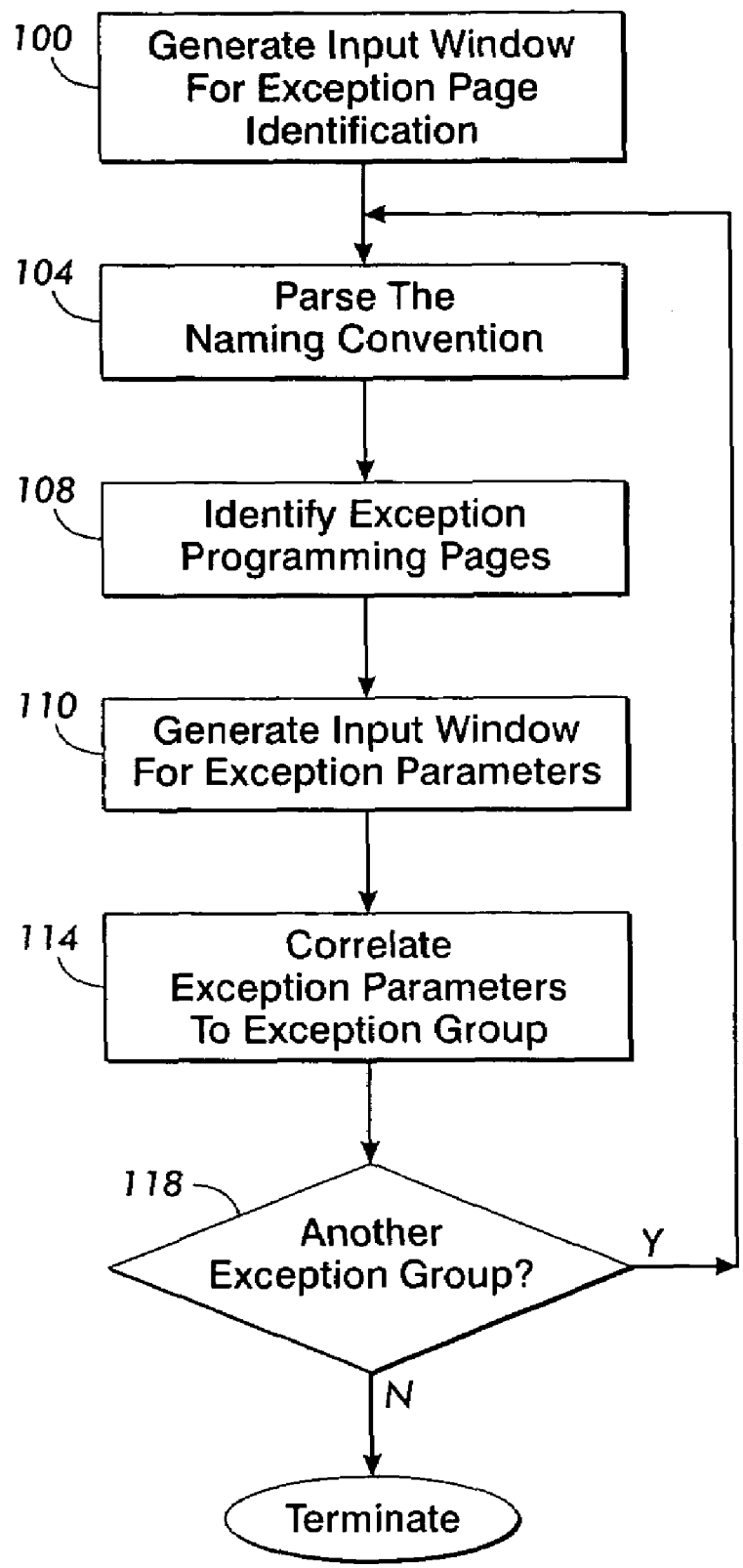
FIG. 4 is a flow diagram of an exemplary method for exception programming of pages within a document processed by the document management system of FIG. 1.

An exemplary method implementing the principles of the present invention is shown in FIG. 4. The process includes generating an input window for exception page identification (block 100). The process parses the naming convention entered in the input window (block 104) and identifies the pages that are grouped together for application of a set of exception parameters (block 108). Another window is generated for input of the exception parameters to be applied to a group of exception pages (block 110). Also, exception parameters may be specified by activating one or more icons displayed for exception programming (FIG. 3). The specified exception parameters are correlated to the identified exception pages (block 114). If another naming convention is entered into the exception page identification window (block 118), the process continues by parsing the naming convention (block 104), identifying the pages for an exception group (block 108), and correlating entered exception parameters to the identified exception group (blocks 110 and 114). The process continues until the operator no longer identifies exception groups for the printing of a document.

In operation, a document management station of a document processing system is modified to include programs for implementing the exception page selector so pages within a document may be identified with a naming convention and the exception programmer so exception parameters for the identified pages may be specified. Thereafter, an operator may select the exception programming function of the document management system and enter a naming convention for identifying a group of pages within a document for exception programming. The parameters for the exception programming may be identified through the exception programmer and correlated to a group of pages identified for exception programming. During the printing operation, a controller within printer module 24 applies the exception parameters correlated to a page by searching each exception group to determine whether exception parameters are to be applied to the page during printing. If exception parameters are to be applied, the controller alters the operation of printer module 24 to conform to the specified exception parameters. The controller then returns the operating conditions for module 24 to those that existed before the exceptions were applied, if the next page is not a member of the exception page group. In this manner, exception page groups are easily identified and exception parameters, such as different color profiles, are more flexibly applied to exception pages.

While the present invention has been illustrated by the description of exemplary processes and system components, and while the various processes and components have been described in considerable detail, applicant does not intend to restrict or in any way limit the scope of the appended claims to such detail. For example, while the process of FIG. 4 depicts the serial operation of exception page group identification followed by specification of the exception parameters, the process may also be constructed to allow identification of all exception page groups for a document and then accept specification of the exception parameters for each exception page group. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for managing documents for printing in a document management system comprising:

identifying a group of pages within a document for application of exception programming with a naming convention, the group of pages identified within the document numbering less than a total number of pages in the document, and the naming convention being an alphanumeric identifier that identifies the group of pages without requiring an operator to identify each page in the group individually; and specifying exception parameters for the exception programming to be applied to the group of pages identified by the naming convention.

2. The method of claim 1, the identification of pages with a naming convention further comprising:

selecting an imposition scheme template alphanumeric identifier from a displayed menu.

3. The method of claim 2, the identification of pages with a naming convention further comprising:

entering data that identifies a page range in the document to which an imposition scheme corresponding to the selected imposition template alphanumeric identifier is to be applied.

4. The method of claim 3, the page designation further comprising:

entering data that designates pages with numerals that are separated by white space characters.

5. The method of claim 4, the data entry further comprising:

entering a range indicator between the page numerals.

6. The method of claim 5, the page identification further comprising:

selecting an imposition scheme template alphanumeric identifier that designates odd-numbered pages in the page range indicated by the page numerals and range indicator for inclusion into the group of pages to which the exception programing is to be applied.

7. The method of claim 1, the exception parameter specification further comprising:

specifying a device color profile for the group of identified pages to which the exception programming is to be applied.

8. The method of claim 1, the exception parameter specification further comprising:

specifying a trapping parameter for the group of identified pages to which the exception programming is to be applied.

9. The method of claim 1, the exception parameter specification further comprising:

specifying black overprinting parameters for the group of identified pages to which the exception programming is to be a applied.

10. The method of claim 1, the exception parameter specification further comprising:

specifying anti-aliasing parameters for the group of identified pages to which the exception programming is to be applied.

11. A system for managing documents for printing in a document management system comprising:

an exception page selector that is configured to display a menu of alphanumeric naming conventions, each alphanumeric naming convention identifying a group of pages in a document that number less than a total number of pages in the document without requiring an operator to identify each page in the group individually; and an exception programmer that is configured to specify exception parameters for the pages corresponding to an alphanumeric naming convention selected from the alphanumeric naming conventions in the displayed menu.

12. The system of claim 11, the exception page selector including:

an input window configured for entering data corresponding to one of the naming conventions displayed in the menu.

13. The system of claim 12 wherein the input window is configured for entry of page numerals separated by a range indicator.

14. The system of claim 13 wherein the input window is configured for entry of an even/odd designator for the pages identified by the naming convention selected from the displayed menu.

15. The system of claim 11, the naming conventions displayed in the menu including:

an imposition scheme template identifier that designates odd-numbered pages in the document as being in the group of pages to which the exception programming is to be applied.

16. The system of claim 11 wherein the exception programmer is configured to specify a device color profile parameter that is to be applied to the pages in the document identified by the naming convention selected from the displayed menu.

17. The system of claim 11 wherein the exception programmer is configured to specify a trapping parameter that is to be applied to the pages in the document identified by the naming convention selected from the displayed menu.

18. The system of claim 11 wherein the exception programmer is configured to specify one of a black overprinting parameter and an anti-aliasing parameter that is to be applied to the pages in the document identified by the naming convention selected from the displayed menu.

* * * * *